(12) United States Patent
Smith et al.

(10) Patent No.: US 7,991,386 B2
(45) Date of Patent: Aug. 2, 2011

(54) SYSTEM AND METHOD FOR AUTHORIZING THE ACTIVATION OF A COMMUNICATION DEVICE

(75) Inventors: Merrill Brooks Smith, Atlanta, GA (US); Phillip Craig Graves, Atlanta, GA (US)

(73) Assignee: e2Interactive, Inc., Atlanta, GA (US)

( * ) Notice: Subject to any disclaimer, the term of this patent is extended or adjusted under 35 U.S.C. 154(b) by 970 days.

(21) Appl. No.: 10/778,338

(22) Filed: Feb. 17, 2004

(65) Prior Publication Data

US 2005/0107068 A1 May 19, 2005

Related U.S. Application Data

(60) Provisional application No. 60/519,629, filed on Nov. 14, 2003.

(51) Int. Cl.
*H04M 11/00* (2006.01)

(52) U.S. Cl. .......................................... 455/409; 455/406

(58) Field of Classification Search ................... 455/409, 455/406, 411, 558
See application file for complete search history.

(56) References Cited

U.S. PATENT DOCUMENTS

| | | | |
|---|---|---|---|
| 5,383,113 A | | 1/1995 | Kight |
| 5,386,455 A | * | 1/1995 | Cooper ........................ 455/419 |
| 5,465,288 A | | 11/1995 | Falvery |
| 5,577,109 A | | 11/1996 | Stimson et al. |
| 5,870,724 A | | 2/1999 | Lawlor |
| 5,887,253 A | | 3/1999 | O'Neil |
| 5,903,633 A | * | 5/1999 | Lorsch ........................ 379/114.2 |
| 5,903,830 A | | 5/1999 | Joao |
| 5,918,909 A | | 7/1999 | Fiala et al. |
| 5,930,363 A | | 7/1999 | Stanford |
| 5,945,653 A | | 8/1999 | Walker |
| 5,956,636 A | * | 9/1999 | Lipsit ........................... 455/411 |
| 5,956,700 A | | 9/1999 | Landry |
| 5,974,311 A | | 10/1999 | Lipsit |
| 5,991,748 A | | 11/1999 | Taskett |
| 6,000,608 A | | 12/1999 | Dorf |
| 6,012,049 A | | 1/2000 | Kawan |
| 6,032,135 A | | 2/2000 | Molano |
| 6,058,300 A | | 5/2000 | Hanson |
| 6,088,682 A | | 7/2000 | Burke |

(Continued)

FOREIGN PATENT DOCUMENTS

EP   1 361 775 A1   11/2003

(Continued)

OTHER PUBLICATIONS

European Search Report, Application No. 04256999.6-2412, dated May 7, 2007.

*Primary Examiner* — George Eng
*Assistant Examiner* — Muthuswamy Manoharan
(74) *Attorney, Agent, or Firm* — Landmark Intellectual Property Law, PLLC

(57) ABSTRACT

A system and method for authorizing the activation of a communication device is provided. A request to activate a communication device is received by a communication service provider. The communication service provider or a central processor determines whether the communication device was validly sold in a purchase transaction. Alternately, the communication service provider can outsource the determining step to a central processor. The communication service provider or central processor determines whether to activate the communication device based on the determining action.

15 Claims, 5 Drawing Sheets

U.S. PATENT DOCUMENTS

| | | |
|---|---|---|
| 6,119,106 A | 9/2000 | Mersky |
| 6,119,946 A | 9/2000 | Teicher |
| 6,124,799 A | 9/2000 | Parker |
| 6,185,545 B1 | 2/2001 | Resnick et al. |
| 6,188,752 B1 | 2/2001 | Lesley |
| 6,189,787 B1 | 2/2001 | Dorf |
| 6,208,851 B1 | 3/2001 | Hanson |
| RE37,122 E | 4/2001 | Levine |
| 6,282,566 B1 | 8/2001 | Lee, Jr. et al. |
| 6,285,749 B1 | 9/2001 | Manto |
| 6,311,170 B1 | 10/2001 | Embrey |
| 6,314,171 B1 | 11/2001 | Dowens |
| 6,315,206 B1 | 11/2001 | Hansen et al. |
| 6,330,544 B1 | 12/2001 | Walker |
| 6,332,135 B1 | 12/2001 | Conklin |
| 6,333,976 B2 | 12/2001 | Lesley |
| 6,375,073 B1 | 4/2002 | Aebi et al. |
| 6,424,706 B1 | 7/2002 | Katz et al. |
| 6,434,379 B1 | 8/2002 | Despres et al. |
| 6,445,780 B1 | 9/2002 | Rossett |
| 6,473,500 B1 * | 10/2002 | Risafi et al. ............. 379/144.01 |
| 6,478,401 B1 | 11/2002 | King |
| 6,490,445 B1 | 12/2002 | Holmes |
| 6,494,367 B1 | 12/2002 | Zacharias |
| 6,502,745 B1 | 1/2003 | Stimson |
| 6,507,644 B1 | 1/2003 | Henderson |
| 6,529,593 B2 | 3/2003 | Nelson |
| 6,549,770 B1 | 4/2003 | Marran |
| 6,575,361 B1 | 6/2003 | Graves |
| 6,581,827 B2 | 6/2003 | Welton |
| 6,588,658 B1 | 7/2003 | Blank |
| 6,591,098 B1 | 7/2003 | Shieh |
| 6,592,035 B2 | 7/2003 | Mandile |
| 6,612,487 B2 | 9/2003 | Tidball |
| 6,625,438 B2 | 9/2003 | Hanson |
| 6,636,489 B1 * | 10/2003 | Fingerhut ..................... 370/328 |
| 6,643,503 B1 | 11/2003 | Phillips |
| 6,648,222 B2 | 11/2003 | McDonald |
| 6,745,022 B2 | 6/2004 | Knox |
| 6,805,289 B2 | 10/2004 | Noriega |
| 6,827,260 B2 | 12/2004 | Stoutenburg et al. |
| 6,829,596 B1 | 12/2004 | Frazee |
| 6,934,529 B2 | 8/2005 | Bagoren |
| 7,028,891 B2 | 4/2006 | O'Neal |
| 7,069,248 B2 | 6/2006 | Huber |
| 7,083,084 B2 | 8/2006 | Graves |
| 7,086,584 B2 | 8/2006 | Stoutenburg |
| 7,093,761 B2 | 8/2006 | Smith |
| 7,096,003 B2 | 8/2006 | Joao |
| 7,103,347 B2 | 9/2006 | Chow |
| 7,131,582 B2 | 11/2006 | Welton |
| 7,168,615 B2 | 1/2007 | Smith |
| 7,209,890 B1 | 4/2007 | Peon |
| 7,243,839 B2 | 7/2007 | Beck |
| 7,260,381 B2 | 8/2007 | Lipsit |
| 7,272,385 B2 | 9/2007 | Mirouze |
| 7,363,265 B2 | 4/2008 | Horgan |
| 2001/0000808 A1 | 5/2001 | Lesley |
| 2001/0001321 A1 | 5/2001 | Resnick |
| 2001/0001856 A1 | 5/2001 | Gould |
| 2001/0023415 A1 | 9/2001 | Keil |
| 2001/0042784 A1 | 11/2001 | Fite |
| 2001/0044293 A1 | 11/2001 | Morgan |
| 2002/0022966 A1 | 2/2002 | Hogan |
| 2002/0025797 A1 | 2/2002 | Joao |
| 2002/0077076 A1 | 6/2002 | Suryanarayana et al. |
| 2002/0088851 A1 | 7/2002 | Hodes |
| 2002/0091573 A1 | 7/2002 | Hodes |
| 2002/0101966 A1 | 8/2002 | Nelson |
| 2002/0115424 A1 | 8/2002 | Bagoren et al. |
| 2002/0119767 A1 | 8/2002 | Fieldhouse et al. |
| 2002/0133457 A1 | 9/2002 | Gerlach et al. |
| 2003/0004889 A1 | 1/2003 | Fiala et al. |
| 2003/0014360 A1 | 1/2003 | Arditti et al. |
| 2003/0092435 A1 * | 5/2003 | Boivin ........................ 455/419 |
| 2003/0144909 A1 | 7/2003 | Flaherty |
| 2003/0172031 A1 | 9/2003 | Graves |
| 2003/0194988 A1 * | 10/2003 | Knox ........................... 455/406 |
| 2003/0200179 A1 | 10/2003 | Kwan |
| 2003/0204457 A1 | 10/2003 | Arias |
| 2003/0218062 A1 | 11/2003 | Noriega |
| 2004/0009760 A1 | 1/2004 | Layburn |
| 2004/0049427 A1 | 3/2004 | Tami |
| 2004/0129777 A1 | 7/2004 | Smith |
| 2004/0153402 A1 | 8/2004 | Smith |
| 2004/0218741 A1 | 11/2004 | Welton |
| 2004/0230536 A1 | 11/2004 | Fung |
| 2004/0267663 A1 | 12/2004 | Karns |
| 2005/0051619 A1 | 3/2005 | Graves |
| 2005/0060248 A1 | 3/2005 | O'Neal |
| 2005/0086171 A1 | 4/2005 | Abe |
| 2005/0107068 A1 | 5/2005 | Smith |
| 2005/0127169 A1 | 6/2005 | Foss |
| 2005/0131815 A1 | 6/2005 | Fung |
| 2005/0143051 A1 | 6/2005 | Park |
| 2005/0202850 A1 | 9/2005 | Kuty |
| 2005/0228720 A1 | 10/2005 | Pavlic |
| 2005/0263587 A1 | 12/2005 | Martinez |
| 2006/0023856 A1 | 2/2006 | Welton |
| 2006/0030306 A1 | 2/2006 | Kuhn |
| 2006/0085335 A1 | 4/2006 | Crawford |
| 2006/0161490 A1 | 7/2006 | Chakiris |
| 2006/0163347 A1 | 7/2006 | Foss |
| 2006/0213985 A1 | 9/2006 | Walker |
| 2006/0217996 A1 | 9/2006 | Graves |
| 2006/0255125 A1 | 11/2006 | Jennings |
| 2006/0289621 A1 | 12/2006 | Foss |
| 2007/0057045 A1 | 3/2007 | Beck |
| 2007/0108269 A1 | 5/2007 | Benco |
| 2007/0119920 A1 | 5/2007 | Hogg |
| 2007/0187490 A1 | 8/2007 | Feldman |

FOREIGN PATENT DOCUMENTS

| | | |
|---|---|---|
| EP | 1361775 | 11/2003 |
| EP | 1534043 | 5/2005 |
| EP | 1705610 | 9/2006 |
| JP | 2006309729 | 11/2006 |
| WO | WO 01-02233 | 1/2001 |
| WO | WO 2005/098770 | 11/2005 |

* cited by examiner

SYSTEM AND METHOD FOR AUTHORIZING THE ACTIVATION OF A COMMUNICATION DEVICE

CROSS-REFERENCE TO RELATED APPLICATIONS

This application claims priority to U.S. Provisional Application No. 60/519,629 filed Nov. 14, 2003.

FIELD OF THE INVENTION

This invention relates to distributing and activating communication devices, such as wireless phones. More particularly, the invention relates to distributing wireless communication devices at point-of-sale merchant terminals wherein the communication devices may be used for wireless communication service.

BACKGROUND OF THE INVENTION

Merchant stores receive wireless phones from distributors and sell the phones and other communication devices to customers. These phones may be pay-as-you-go wireless phones. Typically, the phones are inactive when the stores receive the phones from distributors. Thus, in order for a customer to use a phone after purchase, the phone must be activated through a communication service provider, i.e., a carrier. For instance, a customer may purchase at a merchant store a phone pre-associated with a specific wireless telecommunication provider. To activate the phone, the customer must later call the provider, at which point the provider determines whether to activate the phone. Typically, providers will automatically activate any phone at a customer's request. Once activated, the phone can be used for its intended purpose, such as wireless communication service.

The traditional method does not allow the carrier to know the status of the phone prior to activation. In other words, at the time of activation, but not prior, the carrier will know that the phone is in the hands of a user and no longer in the chain of distribution. However, the carrier will not know whether the phone was ever legitimately purchased at an authorized retailer. For instance, the carrier will not know whether the person calling to activate the phone is requesting to activate a stolen phone or a legitimately purchased phone.

What is desired is a method of distributing the phone to customers so that a carrier can verify that a phone was validly purchased prior to activation.

SUMMARY OF THE INVENTION

In one exemplary embodiment, a method of authorizing the activation of a communication device is provided. A request to activate a communication device is received. It is determined whether the communication device was validly sold in a purchase transaction. Responsive to a determination that the communication device was validly sold in a purchase transaction, activation of the communication device is authorized.

In one exemplary embodiment, a system for authorizing the activation of a communication device is provided. An input device is operative to receive a request to determine whether a communication device was validly sold in a purchase transaction. A processor coupled to the input device is operative to determine whether the communication device was validly sold in a purchase transaction. An output device is operative to output an activation response based on the determining action.

In one exemplary embodiment, a system for authorizing the activation of a communication device is provided. An input device operative to receive a request to activate a communication device is provided. A processor coupled to the input device is operative to process information based on the request and determine whether the communication device was validly sold in a purchase transaction. The processor is further operative to determine whether to activate the communication device based on the determining action. An output device is operative to output an activation response based on the determining actions.

In one exemplary embodiment, a method of enabling a communication device to be activated is provided. Identification indicia of a communication device is input during a sale of a communication device, wherein the communication device may be activated through one or more communication service providers or central processors. A notification that the phone was sold prior to the activation of the phone is output.

In one exemplary embodiment, a method of authorizing activation of a communication device is provided. An identifier is stored in a database entry, wherein the identifier is associated with a communication device. The identifier is received from a merchant as a result of a sale transaction in which a customer purchases the communication device from the merchant. The database entry is updated to indicate that the communication device was validly sold. A request to authorize activation of the communication device is received after the updating action.

In one exemplary embodiment, a method of enabling a communication device to be activated is provided. An identifier is stored in a database entry, wherein the identifier is associated with a communication device received by a merchant, and wherein the communication device may be activated with a communication service provider. The identifier is received from a merchant terminal during a purchase transaction wherein a customer purchases the communication device at the merchant terminal, and wherein the merchant terminal is associated with the merchant. An authorization notification is passed to a communication service provider system associated with the communication service provider, wherein said authorization notification indicates that the communication device was validly sold in the purchase transaction, and wherein the communication device has not yet been activated.

In one exemplary embodiment, a method of enabling a communication device to be activated is provided. An identifier is stored in a database entry, wherein the identifier is associated with a communication device received by a merchant. The identifier is received based on a sale transaction wherein a customer purchases the communication device at a merchant terminal. The database entry is amended to indicate that the communication device was validly sold based on the receiving action. A request to activate the communication device is received from a customer. The database entry may be processed. It may be determined whether to activate the communication device based on the processing action.

In one exemplary embodiment, a method of enabling a communication device to be activated is provided. It is determined whether a communication device was previously sold in a valid purchase transaction, wherein said determining action is responsive to a customer request to activate the communication device, and wherein the communication device has not yet been activated.

In one exemplary embodiment, a method of enabling a communication device to be activated is provided. A request to determine whether a communication device was validly sold is received, said request being associated with a customer request to activate a communication device. It is determined whether the communication device was validly sold. A response based on whether the communication device was validly sold is created.

Other embodiments could be considered.

One advantage of this invention is loss prevention and control, e.g., of communication devices.

Another advantage is that both communication service providers and merchants can track the sales of communication devices such as wireless handsets.

DETAILED DESCRIPTION OF THE EMBODIMENTS

The subject matter of this application is related to the technology described in the following U.S. patents and patent applications: U.S. application Ser. No. 10/253,243 filed Sep. 24, 2002, U.S. Provisional Application No. 60/324,333 filed Sep. 24, 2001, U.S. Provisional Application No. 60/396,404 filed Jul. 15, 2002, U.S. Provisional Application No. 60/519,630 filed on Nov. 14, 2003, U.S. Provisional Application No. 60/519,629 filed on Nov. 14, 2003, U.S. application Ser. No. 10/712,182 filed Nov. 13, 2003, U.S. application Ser. No. 10/655,828 filed Sep. 5, 2003, U.S. patent application Ser. No. 10/698,084 filed Nov. 3, 2003, U.S. application Ser. No. 10/411,971 filed Apr. 11, 2003, U.S. application Ser. No. 09/641,363 filed Aug. 18, 2000 (now issued as U.S. Pat. No. 6,575,361), U.S. Provisional Application No. 60/149,740 filed Aug. 19, 1999, U.S. application Ser. No. 10/732,641 filed Dec. 10, 2003, the U.S. application filed Dec. 19, 2003 under 10/739,301, and the U.S. patent application filed Jan. 16, 2004 under 10/758,429. All of these applications are incorporated herein by reference in their entirety. It should be appreciated that the authorization and activation of communication devices as described herein may be combined with the novel systems and methods of the applications referenced above.

Figure 1:
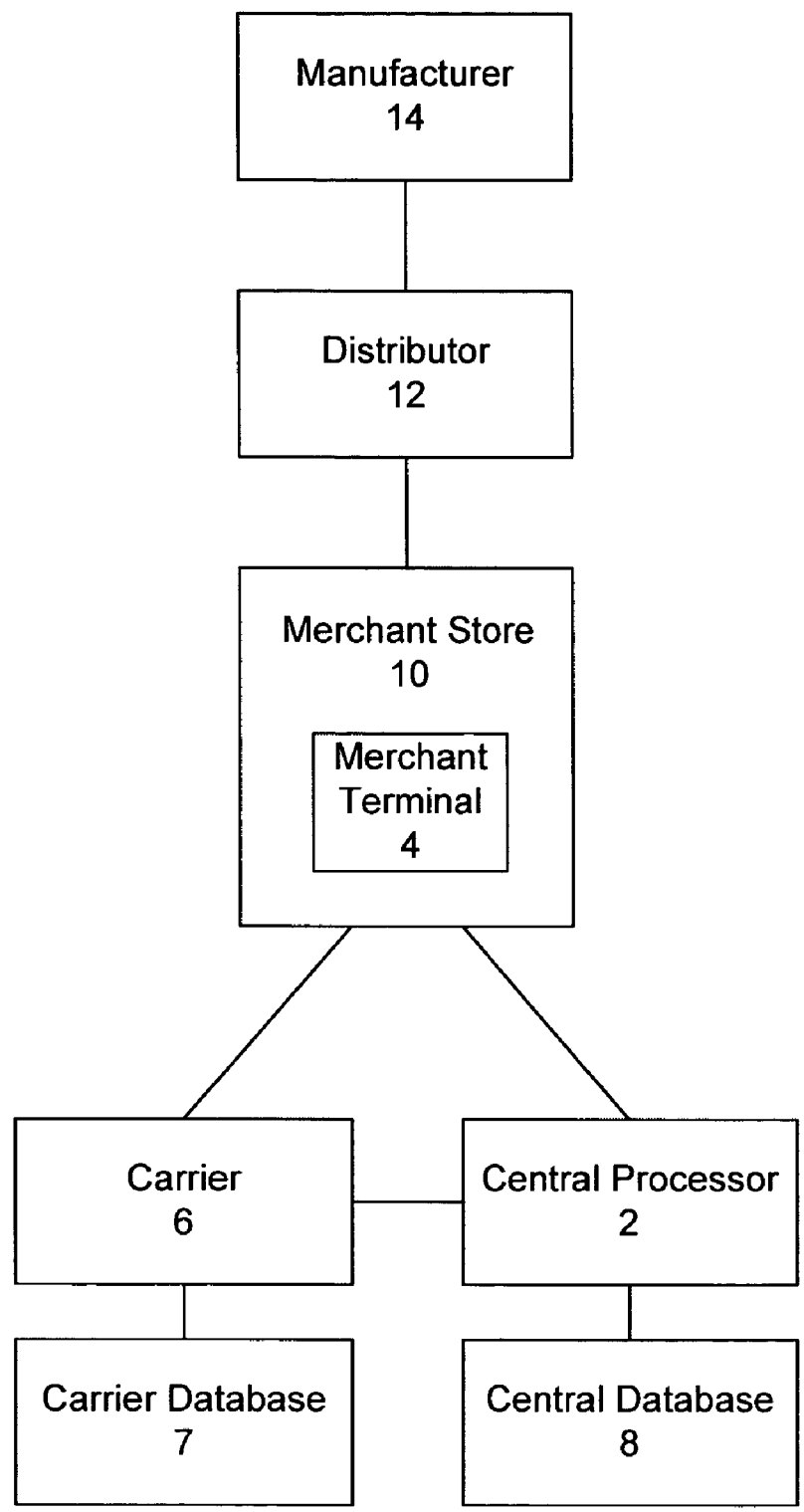
FIG. 1 illustrates a system for authorizing the activation of a communication device according to an embodiment of the invention.

FIG. 1 illustrates a system for authorizing the activation of a communication device according to an embodiment of the invention. The system comprises a manufacturer 14, distributor 12, one or more merchants 10, one or more merchant terminals 4, a central processor 2, a central database 8, a communication service provider 6 (also called "carrier" herein), and a carrier database 7.

The communication device may comprise a wireless handset such as a wireless phone, PDA, pager, phone/PDA combination device, internet-enabled device, or any other communication device. The communication device may be in a package, for instance when it is sold. The communication device package may be any container, box, or packaging that may contain, hold, or otherwise couple to the device. In a preferred embodiment, the package contains the device 16 when the customer purchases the device at a merchant terminal 4.

The manufacturer 14 manufactures communication devices and passes them to one or more distributors 12. The distributors 12 ship the communication devices to one or more merchant stores 10. The merchant stores 10 comprise one or more merchant terminals 4. Customers purchase the communication devices at merchant terminals 4.

The merchant terminals 4 comprise an input/output device for inputting communication device and/or package information (such as an identifier) during a purchase transaction and passing such information to the central processor 2. For instance, the merchant terminals may comprise any point-of-sale terminal configured to process sale transactions between merchants and customers. The merchant terminal 4 may comprise a barcode scanner and credit card reader, and it may be in selective communication with a network as well-known in the art.

The central processor 2 may comprise any data processing system that stores, manages, and/or processes device-related information. In one embodiment, the central processor 2 may itself be a communication service provider 6 (also called a "telecommunications carrier" or "carrier" herein). The central processor 2 is configured to process device-related information (such as an identifier). The central processor 2 is further configured to store device-related information in a central database 8. The information may comprise information received from a merchant terminal 4 during a device sale transaction. The central processor 2 is also configured to communicate information to and from a carrier 6. For instance, the central processor 2 is configured to receive authorization requests and/or status inquiries from carriers 6. The central processor 2 is configured to process information stored in the central database 8 based on such requests and inquiries. The central processor 2 is also configured to pass information to the carrier.

In one embodiment, the central processor 2 is configured to communicate with merchant terminals regarding device activation requests.

The carrier 6 may process information it receives from the central processor 2. The carrier may also store information in a carrier database 7. The carrier 6 is also configured to communicate with customers. For instance, the carrier 6 is configured to receive device activation requests from customers. The carrier 6 is also configured to process information based on the request and/or communicate with the central processor based on the request. The carrier 6 is also configured to pass information to the customer, such as an activation confirmation.

Figure 2:
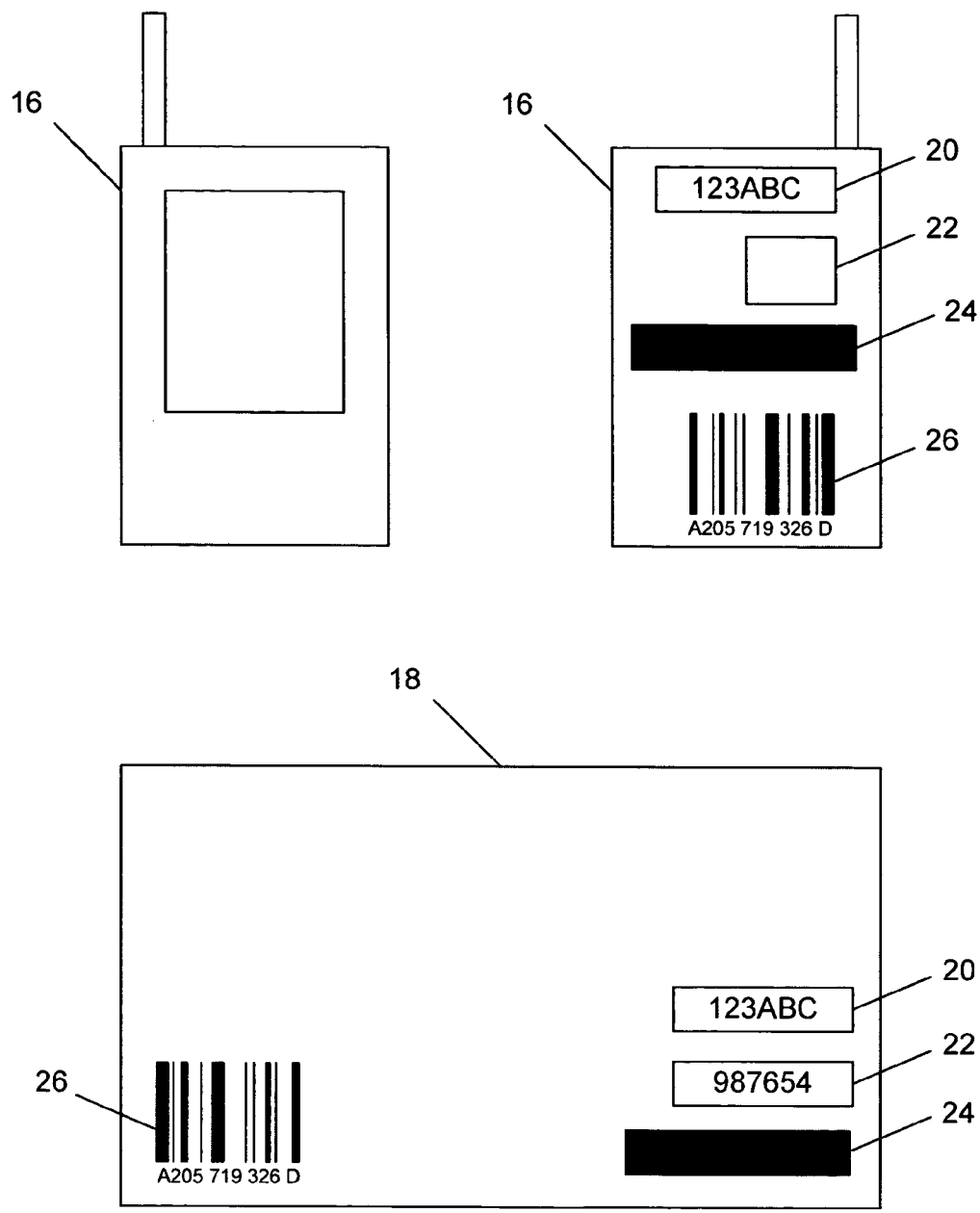
FIG. 2 illustrates an exemplary communication device and package.

FIG. 2 illustrates an exemplary communication device 16 and package 18, the activation of which may be authorized using methods according to the invention. The top left figure in FIG. 2 shows the front view of a typical communication device 16 such as a wireless phone. The top left figure shows the rear view of a typical communication device 16.

The device 16 may have an identifier 20 associated with the device 16. The identifier 20 may be applied to (e.g., labeled on) the device 16, the package 18, or both. The identifier 20 may comprise an electronic serial number (ESN), an IMEI, a subscriber information module (SIM), a UPC code, or other number or indicia that identifies the device 16. For instance, the ESN, IMEI, and/or SIM code may comprise numbers or codes that are uniquely associated with the device 16. The identifier may be applied in a SIM card 22 (or SIM card indicia 22), a magnetic strip 24, and/or a barcode 26. For instance, the barcode 26 may represent the ESN, IMEI, or SIM, and optionally the UPC. In one embodiment, the phone has a SIM card 22 or an equivalent of a SIM card.

The identifier 20 may be visible on the outside of the device 16 and/or package 18, or it may be applied or otherwise encoded on the device 16 and/or package 18. It also may be visible only after manipulating the device 16, such as by taking out a battery. The identifier 20 may be used by the merchant, distributor, carrier, and customer to track the location and activation status of the device 16, or for any other record-keeping purpose such as inventory management.

The device 16 is typically in a package 18 prior to and during sale to a customer. The package may have barcodes and other indicia on it. The package may have an ESN 20 in barcode form. This ESN 20 may also be printed (or magnetically encoded) on the phone itself. There may be more than one identifier 20 associated with the device 16 and/or package 18. The package 18 and device 16 may also have other barcodes used during purchase or during inventory scanning or other product scanning purposes. The package 18 may have one or more identifiers that are identical to or different from the one or more identifiers 20 associated with the device. In a preferred embodiment, the device 16 and package 18 have at least one identifier 20 in common.

The bottom figure of FIG. 2 shows a package 18 configured to contain the handset 16. The package 18 may have one or more identifiers printed or otherwise stored on the package 18 as described for the handset. The package identifiers may be the same or different from the handset identifiers. In a preferred embodiment, the package 18 and device 16 have at least one identifier that is identical on both the package 18 and device 16, such as an ESN 20.

Figure 3:
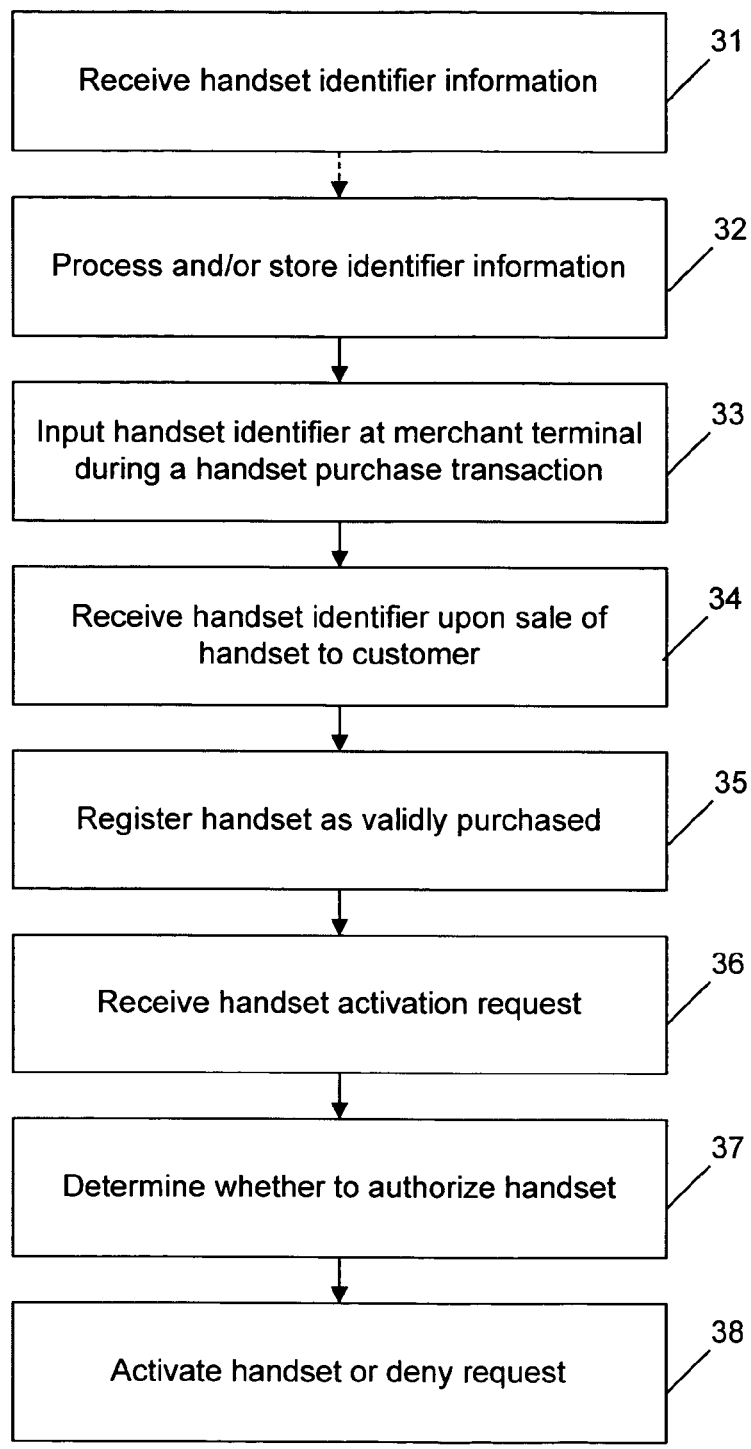
FIG. 3 illustrates a flowchart showing a method of distributing a communication device according to an embodiment of the invention.

FIG. 3 illustrates a flowchart showing a method of authorizing the activation of a communication device according to an embodiment of the invention. As used herein, the term "handset" refers generally to any type of communication device regardless of whether it actually comprises a handset.

In step 31, handset identifier information is received. For instance, the central processor and/or carrier receives handset identifier information. The manufacturer (or distributor) of the handsets may pass an inventory list of handset ESNs (or other identifiers) to the central processor or carrier. Alternately, a merchant may provide a list of handset identifiers to the central processor or carrier after (or before) it receives the handsets from a distributor. The central processor will then have one or more handset identifiers that may eventually purchased from merchants.

In a preferred embodiment, each handset is pre-associated with a carrier. Thus, if the carrier receives handset identifier information, it would only receive handset identifier information for the handsets pre-associated with it. In another embodiment, a carrier is chosen after purchase by the customer. In this embodiment, the carrier would not receive identifier information at this stage.

In optional step 32, the identifier information is stored and/or processed. For instance, the central processor and/or carrier stores identifier information. The central processor and/or carrier may store a list of ESNs corresponding to handsets that were received by a particular store, delivered by a particular distributor, or manufactured by a particular manufacturer. The information may be stored in a central database coupled to the central processor or a carrier database coupled to the carrier. The central processor (and/or carrier) may also store status information associated with each handset. Because the handsets have not yet been sold, the central processor (and/or carrier) may store information for each handset indicating that the handset is "not sold." Other methods of storing and/or identifying stored information may be used.

In step 33, a handset identifier is input at a merchant terminal during a handset purchase transaction. For instance, one or more handset identifiers may be input at a merchant terminal during a transaction in which a customer purchases the handset. In this step, the customer selects a handset to purchase and purchases the handset at a merchant terminal. During the sale, the handset package (or handset) is scanned at the merchant terminal. In a preferred embodiment, an ESN associated with the handset is input at the terminal by scanning the handset package. Whether the package or handset is scanned, the identifier input at the merchant terminal is uniquely associated with the handset itself.

Multiple identifiers may be input at the merchant terminal. For instance, a UPC code may be input as well as an ESN, IMEI, SIM, or other identifier. The UPC may input for merchant inventory purposes, while the ESN may be input for purposes of eventual handset activation.

It should be noted that the handset is inactive or disabled prior to delivery to the customer. For instance, the handset is hotlined or otherwise disabled in the switch. It may be actively or passively disabled. The merchant may disable the handset at (or prior to) purchase. In a preferred embodiment the handset is disabled before it is distributed to the merchant. In one embodiment, the carrier disables the handset, such as before the merchant receives the handset into merchant inventory. For instance, the SIM may be disabled. This may occur before it is offered to the customer (e.g., before the product is placed on the store shelves or otherwise offered to the customer), or it may occur during the purchase transaction. When the SIM is disabled, the handset is disabled and cannot enable wireless handset service. In order to activate the handset, the customer must later contact a central server (such as by calling an 800 number or accessing a website of the carrier) and activate the handset. The server may comprise a computer or handset system of a telecommunications provider (i.e., carrier), preferably the provider of the wireless service to be enabled on the customer's purchased handset.

In optional step 33, the merchant terminal may also input information regarding the purchaser, such as the purchasers name, address, social security number, PIN, home or other telephone number, email address, website, or other information. Some of this information may be identified via a purchaser credit card or check, or the information may be provided by the customer at the request of the merchant. Customer information may also be passed to the central processor or carrier, which may store such information in a database. This information may be used to verify the identity of the purchaser when the purchaser later activates the phone.

In step 34, the central processor receives a handset identifier. The identifier may be the identifier input in step 33. For instance, the merchant terminal may input the identifier and then pass the identifier to the central processor during sale of the handset to a customer. In a preferred embodiment, this occurs simultaneously with the sale. For instance, the sale transaction may comprise inputting the identifier information and automatically passing the information to the central processor. For instance, a barcode may be scanned during purchase, as with typical transactions, and the barcode number may be passed to the central processor.

If a customer's funds are later determined to be invalid or insufficient, or if there is any other problem with the transaction (e.g., if the phone is returned), the merchant or merchant terminal may notify the central processor of the problem at that time. The phone may then become disabled again. Appropriate records of such return transactions may be stored and passed to the carrier and central processor.

Alternately, there may be a delay between inputting the information at the merchant terminal and passing identifier information to the central processor. For instance, the merchant terminal may wait until the customer's purchase funds clear to ensure that only validly purchased handset identifiers are passed to the central processor.

Also, if a handset is stolen or damaged, or is otherwise not eligible for distribution to a customer, the central processor may amend a database entry corresponding to the handset to reflect that the handset has been "cancelled." Such a handset may not be activated, as reflected by its "cancelled" status.

In step 35, the handset is registered as being validly purchased and/or ready for activation. For example, the phone may become enabled or activated in the switch. In a preferred embodiment, the central processor passes handset identifier information to a carrier system to indicate that the handset was validly purchased. It may pass such information via any communication device or means, such as via the internet, dedicated data line, telephone IVR, or other system.

In a preferred embodiment, the central processor transfers such information via an API so that the carrier system can easily recognize and process the information. After the carrier system processes the information, the handset is registered in the carrier's system as a validly purchased handset. For instance, the carrier may store the identifier in a carrier database file that includes identifiers for handsets that have been validly purchased. The fact that the handset is valid is apparent from the file it is stored in. Or, the carrier may amend an existing database entry corresponding to the handset to indicate that the handset has been validly sold.

Alternately, the central processor may store status information indicating that the handset is "sold and ready for activation." It may store such information in the manner described for the carrier system, or in any manner known in the art.

In step 36, the carrier receives from a customer a request to activate the handset. In this step, a customer contacts the carrier (via phone, internet, etc.) to activate the handset. For instance, the customer may call an 800 number that accesses a carrier IVR system, or the customer may access the carrier's website. The customer may also call a carrier customer service or activation department. The customer provides identifier information to the carrier system so that the carrier system can identify the specific handset for activation. For instance, the customer may provide the ESN or SIM, such as by entering the ESN at an internet or IVR prompt. Alternately, if the customer contacts the carrier using the handset itself, the handset may automatically provide identifier information to the carrier system.

The customer may also provide customer identification information. Such identification information may comprise a customer name, address, phone number, receipt number, product number, or other number or code that may be associated with the purchased phone, purchaser, vendor, or wireless service provider. The carrier may request to verify such information prior to activation.

In step 37, the carrier determines whether the handset has been validly purchased. In a preferred embodiment, the carrier checks its database to determine whether the identifier is associated with a validly purchased handset. For instance, the carrier may determine whether an identifier associated with the handset (such as the ESN) is stored in a database corresponding to valid handsets.

In another embodiment, the carrier system contacts the central processor to determine whether the identified handset has been validly sold. For instance, the carrier system (such as a customer service center) may pass a handset identifier (such as the one provided in step 36) to the central processor. This may occur by accessing a central processor IVR system, or by any other method of communication as described herein. The central processor would receive the identifier, access its database to determine whether the identifier is associated with a validly purchased identifier, and then pass an authorization result back to the carrier. The authorization result may indicate that the phone was validly sold or that the phone was not validly sold (or that there was some other problem associated with the handset). For instance, the central processor may determine the authorization result based on stored authorization status information.

In step 38, the carrier activates the handset or denies the customer's request. If the carrier determines that the handset was validly purchased, the carrier may activate the handset. If the carrier determines that the handset was not validly purchased, or if there is some other problem with the purchase of the handset, then the carrier may deny the customer's request and refuse to activate the phone.

When a carrier activates the handset, the handset becomes usable. For instance, if the handset is a wireless telephone, then activating the handset might allow the customer to use the handset to access the carrier's wireless telecommunications services.

Figure 4:
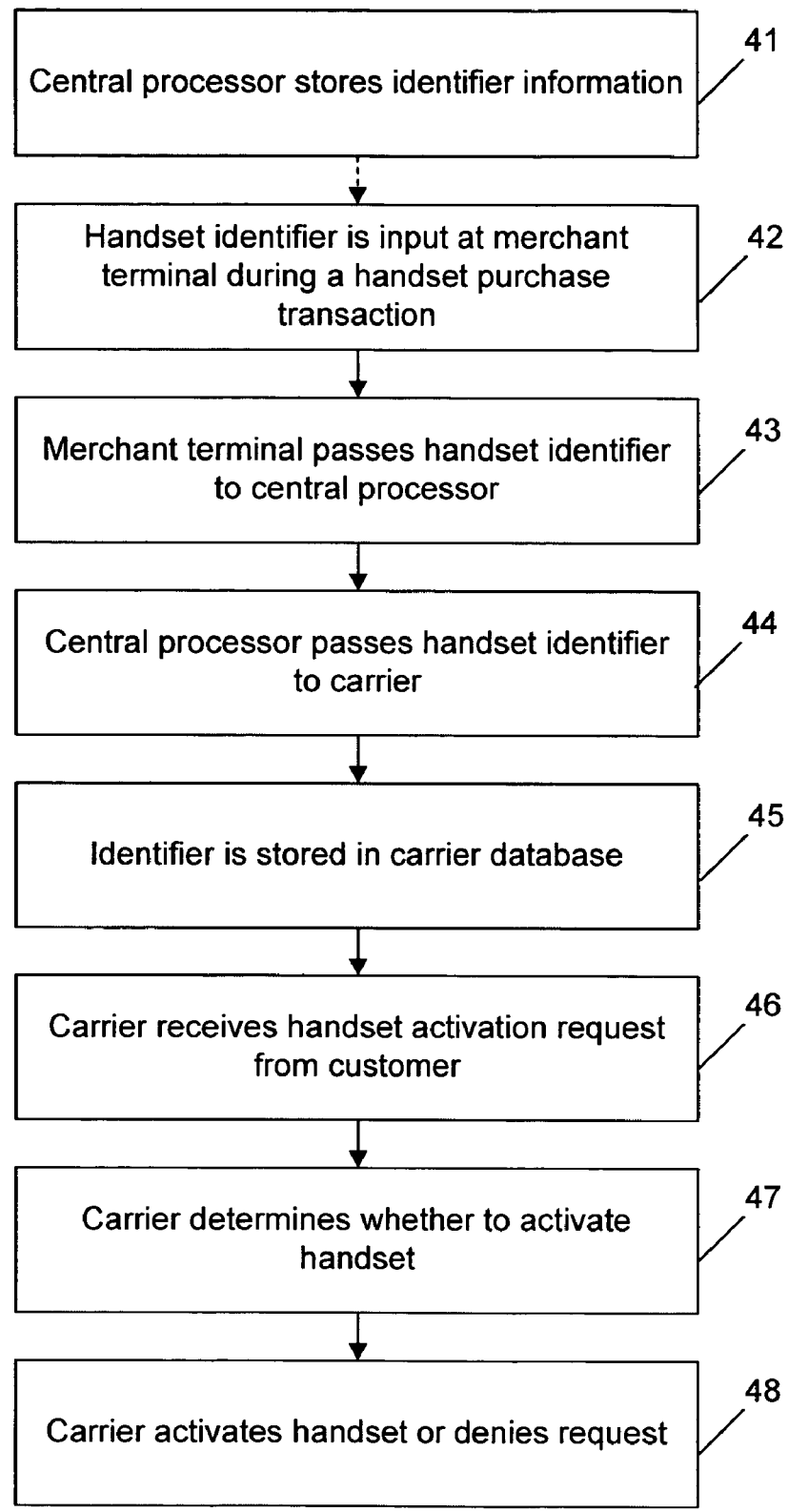
FIG. 4 illustrates a flowchart showing a method of authorizing the activation of a communication device according to another embodiment of the invention.

FIG. 4 illustrates a flowchart showing a method of authorizing the activation of a communication device according to another embodiment of the invention. The method of FIG. 4 should be interpreted in light of the discussion of FIG. 3.

In optional step 41, the central processor stores identifier information, e.g., as described for step 32.

In step 42, a handset identifier is input at a merchant terminal during a handset purchase transaction, e.g., as described for step 33.

In step 43, the merchant terminal passes the identifier to the central processor, e.g., as described for 34.

In step 44, the central processor passes the identifier to the carrier.

In step 45, the identifier is stored in a carrier database. A status of the identifier (and/or corresponding handset) may be stored and/or updated based on receiving the identifier from the central processor. The various status possibilities are described below with respect to FIG. 5.

Steps 44 and 45 may occur when, e.g., the central processor inserts the identifier into a carrier database, e.g., using an API. This process is also described in step 35.

In step 46, the carrier receives a handset activation request, e.g., as described for step 36.

In step 47, the carrier determines whether to activate the handset. This may comprise accessing a carrier database to determine whether the identifier is in the database, or to determine whether the identifier is associated with a handset that has been approved for activation. This may also comprise determining the status of the identifier (and/or the corresponding handset).

In step 48, the carrier responds to the customer request by either activating the handset or by denying the customer request. For instance, if the identifier is in the database (or if the identifier is associated with a handset approved for activation), the carrier will activate the handset. If not, then the carrier may deny the request.

Figure 5:
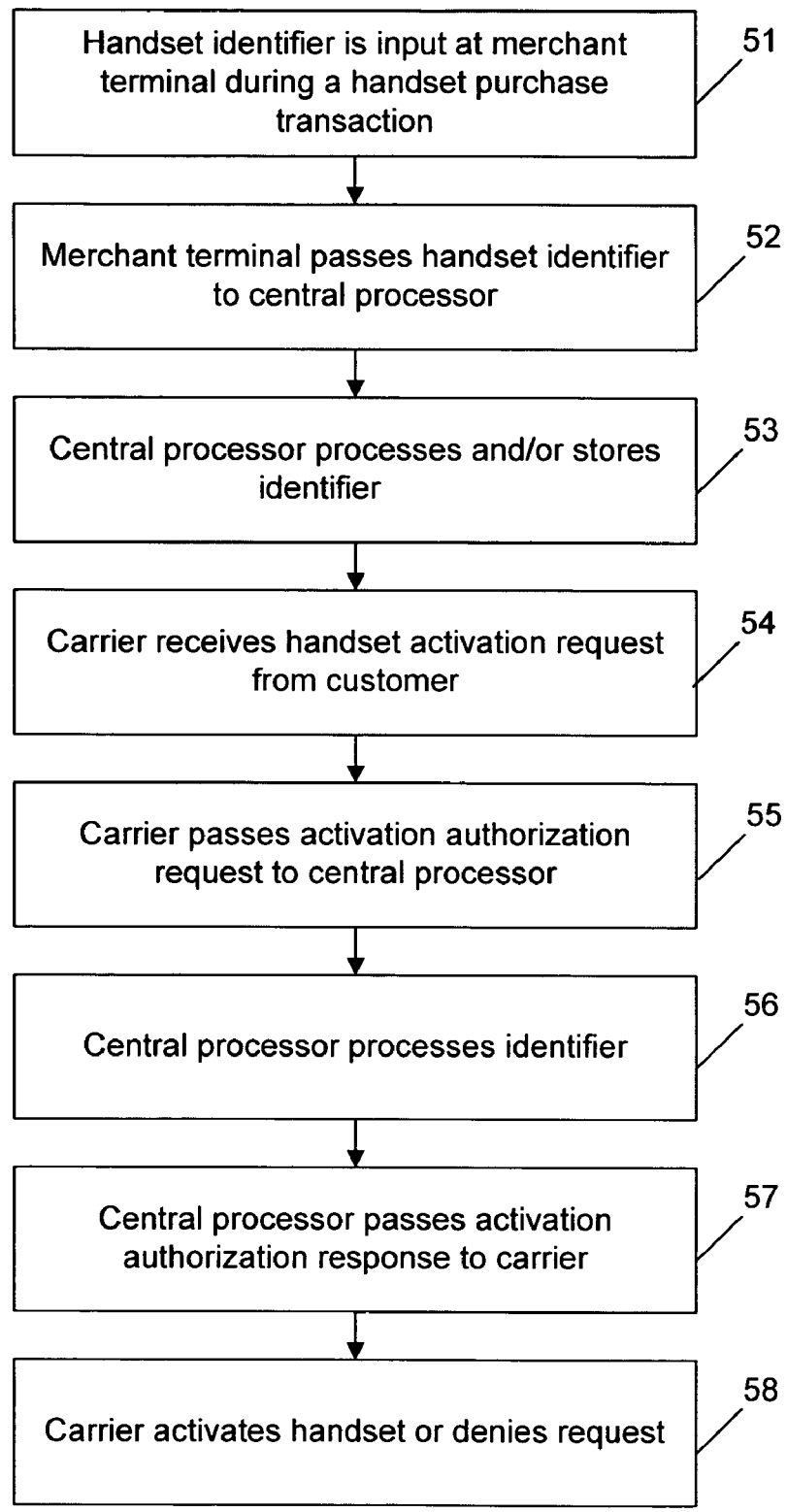
FIG. 5 illustrates a flowchart showing a method of authorizing the activation of a communication device according to yet another embodiment of the invention.

FIG. 5 illustrates a flowchart showing a method of authorizing the activation of a communication device according to yet another embodiment of the invention. The method of FIG. 5 should be interpreted in light of the discussion of FIG. 3.

In step 51, the handset identifier is input at a merchant terminal during a handset purchase transaction, e.g., as described for step 33.

In step 52, the merchant terminal passes handset identifier information to the central processor, e.g., as described for step 43.

In step 53, the central processor processes and/or stores the identifier. For instance, the central processor may store the identifier in a database entry (or amend an existing database entry) to indicate that the identifier was received from a merchant terminal. The entry may be reflect that the corresponding handset has a particular status, e.g., that the handset is sold and ready for activation.

In step 54, the carrier receives a handset activation request from the customer, e.g., as described for step 46.

In step 55, the carrier passes the activation authorization request to the central processor.

In step 56, the central processor processes the identifier. The central processor may determine whether the identifier was validly sold. For instance, the central processor may determine whether the identifier was received in a transaction according to steps 51 and 52. The central processor may also determine the status of the handset (and/or corresponding identifier). For instance, the central processor may determine that the handset has a particular status, such as "sold and ready for activation," "not sold," "sold and activated," "sold and returned," or "cancelled." Depending on the status, the central processor may determine to pass a positive or negative (or other) activation response. For instance, the central processor may determine to send a positive response if the corresponding handset is "sold and ready for activation." The central processor may pass a negative response if the status is "cancelled," "not sold," or "sold and returned."

In step 57, the central processor passes an activation authorization response to the carrier. The authorization response may be an indication to activate or to not activate. The authorization response may comprise status information about the identifier and/or corresponding handset.

In step 58, the carrier either activates the handset or denies the customer's request, e.g., as described for step 48. The carrier's action may be based on the central processor's response in step 57.

It should be noted that different identifiers may be used in the different steps described herein, provided that the different identifiers are associated with a single handset. I.e., it is not necessary that the ESN be the single identifier that is used throughout the process. For instance, a barcoded number (e.g., a number that is mapped to or otherwise associated with a SIM or ESN in a database) may be scanned at the merchant terminal and passed to the central processor, but the processor may determine the SIM or ESN and pass it to the carrier. Here, the central processor may receive the UPC and determine the ESN or SIM that is associated with that barcode by processing information stored in a database (for instance, information received from the merchant associating UPC numbers with ESN numbers). Also, it should be appreciated that the term "identifier" may comprise information associated with the identifier. In other words, an identifier received by a carrier need not be the exact same as the identifier passed from a merchant terminal to a central processor in an earlier step, provided that the two identifiers are uniquely associated with the same device.

It should also be noted that the communication devices mentioned above may be activated in any manner as described for activating PINs in the above-referenced applications.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method of authorizing the activation of a communication device, comprising:
   deactivating or otherwise disabling the communication device prior to sale from a merchant store;
   receiving at a central processor an authorization request from a merchant terminal at the merchant store to authorize activation of a communication device, the central processor being in selective communication with the merchant terminal and a communications service provider;
   determining at the central processor whether the communication device was validly sold from the merchant store in a purchase transaction;
   authorizing at the central processor activation of the communication device, responsive to a determination that the communication device was validly sold from the merchant store in a purchase transaction; and
   sending a notification from the central processor to the communications service provider that the communication device is authorized and ready for activation; and
   receiving an activation request.

2. The method of claim 1, further comprising:
   activating at the central processor the communication device.

3. The method of claim 1, wherein the request is from a customer.

4. The method of claim 1, wherein the request comprises an identifier.

5. The method of claim 4, wherein the identifier comprises at least one of an ESN, SIM, or IMEI.

6. The method of claim 1, wherein the request is received by a communication service provider.

7. The method of claim 1, wherein the communication device is pre-associated with a specific communication service provider.

8. The method of claim 1, wherein the communication device is a wireless communication device.

9. The method of claim 1, wherein the communication device is a wireless phone.

10. The method of claim 1, wherein the communication device is an Internet-enabled PDA.

11. The method of claim 1, wherein the communication device is a pager.

12. The method of claim 1, wherein the communication device can access the interne.

13. The method of claim 1, further comprising:
    denying at the central processor authorization of the communication device responsive to a determination that the communication device was not validly sold in a purchase transaction.

14. The method of claim 1, further comprising:
    receiving from a central processor an identifier associated with the communication device, wherein the determining action comprises processing the identifier.

15. The method of claim 1, further comprising:
    passing an authorization request to a central processor; and
    receiving from the central processor a response to the authorization request,
    wherein the determining action comprises processing the response.

* * * * *